Patented Nov. 25, 1952

2,619,489

UNITED STATES PATENT OFFICE 2,619,489

AMINOTHIODIAZOLES

Ulrich Hörlein, Wuppertal-Elberfeld, Germany, assignor to Schenley Industries, Inc., New York, N. Y.

No Drawing. Application August 14, 1950, Serial No. 179,381. In Germany August 18, 1949

6 Claims. (Cl. 260—306.8)

The present invention relates to thiodiazole compounds and more particularly to 5-N-(β-dimethylaminoethyl)benzylamino - thiodiazole compounds.

It has already been described in the literature that amines wherein a phenyl radical, a benzyl radical and a dimethyl-amino-alkyl radical are linked to a single nitrogen atom are effective antihistamine agents. It is further known that in this type of compound one or the other aromatic radical or, also, both aromatic radicals, may be substituted by certain heterocyclic radicals. On the other hand, it has also been stated in the literature that such characterization of the chemical constitution alone does not suffice to predict the efficacy of a compound as antihistamine agent. There are only a few heterocyclic ring systems (cf. Viaud "Products pharmaceutiques" 2, No. 2, 53 (February 1947) suitable for the formation of antihistamine-active compounds and even a slight alteration of substitution of such antihistamine-active heterocyclic nuclear compounds will suffice to eliminate the desired therapeutical efficacy.

It is an object of the present invention to provide novel compounds having antihistamine efficacy.

A further object of the invention resides in the provision of a process for producing such compounds.

Still further objects will become apparent as the following specification proceeds.

The objects are accomplished by providing as novel antihistamine agents 5-N-(β-dimethylaminoethylbenzylamino-thiodiazoles.

The benzyl radicals may be substituted, for instance, by alkoxy-, alkyl mercapto-, alkyl sulfone-, acylamino-groups or by halogen atoms. The 2-carbon atom of the thiodiazole nucleus may carry a hydrogen atom whereby a very effective compound is already obtained. However, it may also be substituted by lower alkyl radicals, such as methyl-, ethyl-, isopropyl-radicals or by halogen atoms.

The discovery that these compounds comprising a thiodiazole nucleus are especially suited as new antihistamine products provides an interesting enrichment of medicine the more so since the new compounds obtainable according to this invention are not only very effective but also extraordinarily well compatible and display a very great breadth of efficacy.

The production of the aforesaid compounds may be carried out by treating 5-amino-thiodiazoles with reactive derivatives of benzyl alcohol or of a substituted benzyl alcohol, and of dimethylaminoethanol. Among the relative derivatives of benzyl alcohols and dimethylaminoethanol suitable for this purpose are the esters thereof with inorganic and organic acids, preferably, for instance, hydrochloric acid, hydrobromic acid, benzenesulfonic acid, toluenesulfonic acid. A preferred method for preparing the compounds of this invention consists in introducing the benzylamino radical during formation of the thiodiazole nucleus by utilizing $N^4$-benzyl-thiosemicarbazides as starting materials.

The aforesaid compounds can also be obtained from thiodiazoles having, at the 5-position, a substituent such as a halogen atom, which may be replaced by reaction with secondary amines comprised of a benzyl radical and a dimethylaminoethyl group.

In both cases the dimethyl-aminoethyl group may also be produced in steps, for instance, by introducing first a hydroxy-ethyl radical, converting same into a halogen-ethyl radical and finally reacting the halogen-ethyl radical with dimethylamine.

The amino thiodiazoles of this invention can also be obtained by effecting formation of the thiodiazole nucleus from intermediates containing a grouping adapted to form the thiazole ring. For instance, thiosemicarbazones of lower aliphatic aldehydes (for instance formaldehyde, acetaldehyde, propionaldehyde, butyraldehyde, isobutyraldehyde) which are substituted in $N^4$-position by benzyl- and dimethyl-amino-ethyl radicals can be subjected to dehydrogenation, for instance, by means of ferric salts, to yield the desired products.

The compounds thus obtained are distillable, strongly basic oils or low-melting crystals which generally form readily water-soluble salts with inorganic or organic acids.

Example 1

43 grams of isobutyryl chloride are added by drops to a mixture of 36.2 grams (0.2 mol) of 4-benzyl-thiosemicarbazide and 100 ccs. of isobutyric acid at a temperature not exceeding 100° C. After completion of the hydrogen chloride evolution, and excess of ammonia is gradually added, while cooling the mixture with ice, and the 2-isopropyl-5-benzylaminothiodiazole obtained is recrystallized from a mixture of benzene and petroleum ether or ligroin. Its melting point is 107–108° C. and the yield 75–80% of the theoretical.

23.3 grams (0.1 mol) of 2-isopropyl-5-benzylamino-thiodiazole are boiled in 100 ccs. of xylene with 4.5 grams of sodamide. After completion of the ammonia evolution, which practically ceases after one hour, a solution of 10.8 grams of dimethylaminoethyl chloride drops, and the mixture thus obtained is boiled for another 30 to 60 minutes. After cooling, the base formed is extracted from the xylene with dilute hydrochloric acid and the hydrochloric acid solution is neutralized with sodium acetate and filtered. The solution is then rendered strongly alkaline, extracted with ether, dried over potassium carbonate and distilled. The 2 - isopropyl - 5 - N - (β - dimethylaminoethyl) benzylamino-thiodiazole boils at 192–196° C. under 0.3 mm. pressure. It forms a picrate of the melting point 117–119° C.

*Example 2*

An intimately ground mixture of 90 grams of sodium nitrite and 100 grams of sodium bromide are introduced at —10° C. into a mixture of 122 grams of 2-isopropyl-5-amino-thiodiazole, 1000 ccs. of hydrobromic acid ($d=1.5$) and 150 grams of sodium bromide which has been cooled to said temperature. The reaction mixture is left standing over night, then poured into about 1500 ccs. of ice water and the precipitated oil is taken up with ether. The ethereal solution obtained is washed, first with bisulfite solution, thereafter with sodium bicarbonate solution, dried over sodium sulfate and distilled. The 2-isopropyl-5-bromo-thiodiazole formed boils at 116° C. under 10 mm. pressure, the yield amounts to 43 grams.

A solution of 20.6 grams (0.1 mol) of 2-isopropyl-5-bromo-thiodiazole is slowly added by drops to a boiling solution of 26.7 grams per N (0.15 mole) of N-β-dimethylaminoethylbenzylamine in 50 ccs. of dioxane. After boiling for 48 hours, the mixture is made acid to Congo red with dilute hydrochloric acid and the solution is evaporated to dryness. The residue is taken up with water, filtered and rendered alkaline. It is extracted with ether, dried and distilled. The 2-isopropyl - 5 - N - (β - dimethylaminoethyl) benzylaminothiodiazole thus obtained boils at 200° C. under 1 mm. pressure and forms a picrate of the melting point 117–119° C. which is identical to the compound described in Example 1.

*Example 3*

36.2 grams of 4-benzyl-thiosemicarbazide in 100 ccs. of glacial acetic acid and 40 grams of acetyl chloride are mixed and processing is carried out as described in Example 1. The 2-methyl - 5 - benzyl - amino - thiodiazole obtained yields crystals having a melting point 138–139° C. when crystallized from benzene. The further reaction with dimethyl-amino-ethyl-chloride is also performed as described in Example 1. The 2 - methyl - 5 - N - (β-dimethylaminoethyl) benzylamino-thiodiazole thus obtained boils at 180–190° C. under 0.1 mm. pressure and forms a methane sulfonate of the melting point 154–155.5° C. The picrate melts at 151° C.

*Example 4*

1500 ccs. of hydrobromic acid ($d=1.5$), 173 grams of 2-methyl-5-amino-thiodiazole and 250 grams of sodium bromide are mixed as described in Example 2 and cooled to —10° C. A finely ground mixture of 140 grams of sodium nitrite and 100 grams of sodium bromide are added as described in Example 2. Thereafter the product bromide is separated from the solution after dilution with an equal volume of sodium bisulfite solution. The solution is subsequently deacidified with sodium bicarbonate. The solution is then treated with ether in an extractor for some days, a portion difficultly soluble in ether is separated and, finally, the 2-methyl-5-bromo-thiodiazole recovered from this portion is recrystallized from a mixture of ether and petroleum ether. Its melting point is 105–106° C.

The further reaction with N-(β-dimethylaminoethyl)-benzylamine is carried out as described in Example 2 and results in the formation of 2 - methyl - 5 - N - (β - dimethylaminoethyl)-benzylamino-thiodiazole, the picrate of which has a melting point of 151° C. and is identical with the compound described in Example 3.

*Example 5*

21.1 grams (0.1 mol) of 4-p-methoxybenzyl-thiosemicarbazide, 50 ccs. of glacial acetic acid and 25 grams of acetyl chloride are reacted as described in Example 1. The 2-methyl-5-p-methoxybenzylaminothiodiazole recrystallized from a mixture of benzene and petroleum ether, melts at 118–119° C.

Amino-alkylation is performed as described in Example 1. It yields the 2-methyl-5-[N-(β-dimethylaminoethyl) - p - methoxy - benzylamino]-thiodiazole, boiling at 198–200° C. under 0.5 mm. pressure and forming a hydrochloride of the melting point 190° C.

*Example 6*

24.2 grams (0.1 mol) of 2:5-dibromo-thiodiazole, 17.8 grams (0.1 mol) of N-(dimethylaminoethyl)-benzylamine and 42 grams of potassium carbonate in 250 ccs. of acetone are boiled for 72 hours. The acetone is evaporated from the filtered solution and the residue is taken up with dilute hydrochloric acid. The solution is neutralized and filtered. The solution is then rendered alkaline, extracted with ether and dried over potassium carbonate. The residue remaining after evaporation is taken up with alcohol and reacted with alcoholic picric acid. The picrate of 2-bromo-5-N-(β-dimethylaminoethyl)-benzylamino-thiodiazole is recrystallized from a mixture of acetone and alcohol. The picrate melts at 135–136° C. The corresponding hydrochloride has a melting point of 171–172° C.

I claim:

1. A compound having antihistamine efficacy and having the following general formula

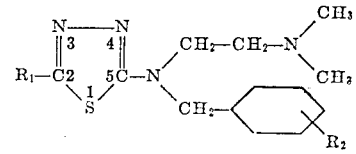

wherein R₁ is a radical selected from the group consisting of hydrogen, the lower alkyl groups and bromine, while R₂ is a radical of the group consisting of hydrogen and lower alkoxy.

2. 2 - isopropyl - 5 - N - (β - dimethylaminoethyl) benzylamino-thiodiazole.

3. 2 - methyl - 5 - N - (β - dimethylaminoethyl) benzylamino-thiodiazole.

4. 2 - bromo - 5 - N - (β - dimethylaminoethyl) benzylamino-thiodiazole.

5. 2 - ethyl - 5 - N - (β-dimethylaminoethyl)-benzylamino-thiodiazole.

6. 2 - methyl - 5 - [N - (β-dimethylaminoethyl)-4-methoxy benzylamino]-thiodiazole.

ULRICH HÖRLEIN.

REFERENCES CITED

The following references are of record in the file of this patent:

UNITED STATES PATENTS

| Number | Name | Date |
|---|---|---|
| 2,440,703 | Sondern | May 4, 1948 |
| 2,457,078 | Zienty | Dec. 21, 1948 |
| 2,502,151 | Herclois | Mar. 28, 1950 |
| 2,519,325 | Sondern | Aug. 15, 1950 |